United States Patent
Datla et al.

(10) Patent No.: US 11,822,605 B2
(45) Date of Patent: Nov. 21, 2023

(54) MULTI DOMAIN REAL-TIME QUESTION ANSWERING SYSTEM

(71) Applicant: KONINKLIJKE PHILIPS N.V., Eindhoven (NL)

(72) Inventors: Vivek Varma Datla, Ashland, MA (US); Sheikh Sadid Al Hasan, Cambridge, MA (US); Oladimeji Feyisetan Farri, Yorktown Heights, NY (US); Junyi Liu, Windham, NH (US); Kathy Mi Young Lee, Westford, MA (US); Ashequl Qadir, Melrose, MA (US); Adi Prakash, Waltham, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 107 days.

(21) Appl. No.: 16/342,635

(22) PCT Filed: Oct. 17, 2017

(86) PCT No.: PCT/EP2017/076390
§ 371 (c)(1),
(2) Date: Apr. 17, 2019

(87) PCT Pub. No.: WO2018/077655
PCT Pub. Date: May 3, 2018

(65) Prior Publication Data
US 2020/0050636 A1 Feb. 13, 2020

Related U.S. Application Data (60) Provisional application No. 62/531,542, filed on Jul. 12, 2017, provisional application No. 62/411,947, filed on Oct. 24, 2016.

(51) Int. Cl.
*G06F 16/9032* (2019.01)
*G06F 16/23* (2019.01)
*G06N 20/00* (2019.01)
*G06F 16/2457* (2019.01)
(Continued)

(52) U.S. Cl.
CPC .... *G06F 16/90332* (2019.01); *G06F 16/2379* (2019.01); *G06F 16/248* (2019.01);
(Continued)

(58) Field of Classification Search
CPC .......................... G06F 16/90332; G06F 16/2379
See application file for complete search history.

(56) References Cited

U.S. PATENT DOCUMENTS 5,703,655 A * 12/1997 Corey .................... H04N 7/088
348/718
2008/0294637 A1* 11/2008 Liu ..................... G06Q 30/0601
705/26.1
(Continued)

OTHER PUBLICATIONS

International Search Report and Written Opinion for International Application No. PCT/EP2017/076390, dated Feb. 23, 2018, 13 pages.
(Continued)

*Primary Examiner* — Sherrod L Keaton (57) ABSTRACT

A system (1000) for automated question answering, including: semantic space (210) generated from a corpus of questions and answers; a user interface (1030) configured to receive a question; and a processor (1100) comprising: (i) a question decomposition engine (1050) configured to decompose the question into a domain, a keyword, and a focus word; (ii) a question similarity generator (1060) configured to identify one or more questions in a semantic space using the decomposed question; (iii) an answer extraction and ranking engine (1080) configured to: extract, from the semantic space, answers associated with the one or more identified questions; and identify one or more of the extracted answers as a best answer; and (iv) an answer tuning engine (1090) configured to fine-tune the identified
(Continued)

best answer using one or more of the domain, keyword, and focus word; wherein the fine-tuned answer is provided to the user via the user interface.

19 Claims, 10 Drawing Sheets

(51) Int. Cl.
  *G06F 16/248* (2019.01)
  *G06F 40/279* (2020.01)
  *G06F 40/211* (2020.01)
  *G06F 40/30* (2020.01)
  *G06N 5/04* (2023.01)
(52) U.S. Cl.
  CPC ...... *G06F 16/24578* (2019.01); *G06F 40/211* (2020.01); *G06F 40/279* (2020.01); *G06F 40/30* (2020.01); *G06N 5/04* (2013.01); *G06N 20/00* (2019.01)

(56) References Cited

U.S. PATENT DOCUMENTS

| | | |
|---|---|---|
| 2010/0030769 A1 | 2/2010 | Cao et al. |
| 2013/0035931 A1 | 2/2013 | Ferrucci et al. |
| 2014/0358922 A1 | 12/2014 | Alkov et al. |
| 2015/0039536 A1* | 2/2015 | Cook ................ G06F 16/24575 706/11 |
| 2015/0254997 A1* | 9/2015 | Thomas .................. G06F 16/35 434/237 |
| 2015/0356170 A1 | 12/2015 | Allen et al. |
| 2016/0019805 A1 | 1/2016 | Allen et al. |
| 2016/0335693 A1* | 11/2016 | Lin ..................... G06F 16/2425 |
| 2017/0192976 A1* | 7/2017 | Bhatia ............... G06F 16/24522 |
| 2017/0337479 A1* | 11/2017 | Trischler ................. G06F 40/30 |
| 2017/0351677 A1* | 12/2017 | Chaubal ................ G06F 16/248 |

OTHER PUBLICATIONS

Kalyanpur, et al., "Fact-Based Question Decomposition for Candidate Answer Re-Ranking", Proceedings of the 20th ACM International Conference on Information and Knowledge Management, Glasgow, UK, Oct. 2011, 4 pages.

Datla, et al., "Open Domain Real-Time Question and Answering Based on Semantic and Syntactic Question Similarity", 6 pages (Abstract).

* cited by examiner

MULTI DOMAIN REAL-TIME QUESTION ANSWERING SYSTEM

CROSS-REFERENCE TO PRIOR APPLICATIONS

This application is the U.S. National Phase application under 35 U.S.C. § 371 of International Application No. PCT/EP2017/076390, filed on Oct. 17, 2017, which claims the benefit of both U.S. Provisional Application Ser. No. 62/531,542, filed Jul. 17, 2017, and U.S. Provisional Application Serial No. 62/411,947, filed Oct. 24, 2016. These applications are hereby incorporated by reference herein, for all purposes.

FIELD OF THE INVENTION

The present disclosure is directed generally to automated question answering methods and systems that can provide human-like answers to multi-domain questions in real-time.

BACKGROUND

People are increasingly posing questions to automated systems designed to provide answers. Typically, the questions people ask are subjective and have inherent biases, preferences, and other complexities that make providing an accurate automated answer challenging.

Automatic Question Answering (QA) is a popular area of research in natural language processing. It is typically a complex computational task which involves several components such as question understanding, question focus identification, and answer generation. Typically, the questions people ask are subjective and have inherent biases, preferences, emotions, and other complexities that make providing an accurate automated answer challenging. In addition to issues related to identifying the subjectivity, emotion, and focus of a question, QA systems must provide an answer in real-time, often in less than a minute. The generated answer must also be human-like, which means that in addition to being correct, it must be structured like a normal human response and must be grammatically correct. It is also desirable that the provided answer be concise.

Existing QA systems are mostly focused on answering knowledge driven, factoid based questions which are focused, less ambiguous, and event driven which usually have a phrase for an answer. Factoid based questions are not as strongly influenced by human subjectivity and opinions, and are thus easier to answer. These existing QA systems typically do not understand the focus of the question involved, and do not comprehend or evaluate any emotional or subjective component of the question. Accordingly, existing QA systems are unable to provide information aligned with the questioner's focus, emotion, or subjectivity.

SUMMARY OF THE INVENTION

There is a continued need for automated question answering systems and methods that can provide human-like answers to multi-domain questions across a multitude of topics in real-time.

The present disclosure is directed to inventive methods and systems for automated question answering. Various embodiments and implementations herein are directed to a system that decomposes a user question by understanding the domain and the focus of the question. A pre-trained question domain identification model may use a deep learning based ensemble technique, and may utilize a bidirectional Recurrent Neural Network (RNN)-based encoder-decoder architecture where the encoder converts the question description to a fixed length vector from which the decoder generates the corresponding domain words. The decomposed question is searched across a latent semantic analysis (LSA)/latent Dirichlet allocation (LDA) semantic space built using existing corpora. Once questions having strong similarity with the question asked by the user are identified, the system extracts the answers given to the most similar questions previously asked and ranks them based on the overlap with the identified focus and domain. The best answer given to the question is reconstructed with respect to the identified focus and the domain. According to an embodiment, the system may be optimized to succinctly answer the questions in real time.

Generally in one aspect, a system for automated question answering is provided. The system includes: a semantic space generated from a corpus of questions and answers, a user interface configured to receive a question from a user, and a processor including: (i) a question decomposition engine configured to decompose the received question into at least one domain, one keyword, and one focus word; (ii) a question similarity generator configured to identify one or more questions in a semantic space using the decomposed question, wherein the identified one or more questions are determined to be similar to the received question; (iii) an answer extraction and ranking engine configured to extract, from the semantic space, answers associated with the one or more identified questions, and identify one or more of the extracted answers as a best answer; and (iv) an answer tuning engine configured to fine-tune the identified best answer using one or more of the at least one domain, one keyword, and one focus word; where the fine-tuned answer is provided to the user via the user interface.

According to an embodiment, the system further includes a corpus of questions and answers, where at least some of the questions are associated with a respective answer.

According to an embodiment, the system further includes a pre-processing engine configured to preprocess the received question, comprising one or more of extracting text from the received question, segmenting a sentence of the received question, and correcting a spelling of the received question.

According to an embodiment, the system further includes a semantic space database configured to store the semantic space.

According to an embodiment, the system further includes a syntactic and semantic relatedness engine configured to rank the one or more identified questions based on similarity to the received question.

Generally, in one aspect, a method for automated question answering is provided. The method includes the steps of: (i) providing an automated question answering system comprising a user interface, a processor, and a generated semantic space; (ii) receiving, via the user interface, a question for which is answer is requested; (ii) decomposing, by the processor, the received question into at least one domain, one keyword, and one focus word; (iv) identifying, by the processor, one or more questions in a semantic space using the decomposed question, wherein the identified one or more questions are determined to be similar to the received question; (v) ranking, by the processor, the one or more identified questions based on similarity to the received question; (vi) extracting, by the processor from the semantic space, answers associated with the one or more identified questions; (vii) identifying, by the processor, one or more of the extracted answers as a best answer; (viii) fine-tuning, by the processor, the identified best answer using one or more of the at least one domain, one keyword, and one focus word; and (ix) providing the fine-tuned best answer via the user interface as an answer to the received question.

According to an embodiment, the method further includes the step of generating a semantic space from a corpus of questions and answers, wherein at least some of the questions are associated with a respective answer.

According to an embodiment, the generated semantic space is stored in a database.

According to an embodiment, the questions in the semantic space comprise a vector and the decomposed question comprises a vector, and wherein the vectors of the questions in the semantic space are compared to the vector of the decomposed question, and wherein a question in the semantic space is identified as being similar if the vector comparison is above a predetermined threshold. According to an embodiment, the predetermined threshold comprises a cosine value.

According to an embodiment, the method further includes the step of preprocessing the received question by the processor, comprising one or more of extracting text from the received question, segmenting a sentence of the received question, and correcting a spelling of the received question.

According to an embodiment, the step of ranking the one or more identified questions based on similarity to the received question comprises a semantic and/or syntactic analysis of the identified questions.

According to an embodiment, the step of identifying one or more of the extracted answers as a best answer comprises a ranking of the extracted answers.

According to an embodiment, the system further includes a pre-trained question domain classifier, and the received question is decomposed based at least in part on a pre-trained question domain classifier.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some o f the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of an automated question answering system. More generally, Applicant has recognized and appreciated that it would be beneficial to provide a system that more accurately provides human-like responses to subjective questions in real-time. The automated question answering system receives a user question and extracts one or more domains, focus words, and/or keywords. The system compares the decomposed question across a semantic space, and identifies stored questions that are strongly similar to the posed question. The system then extracts the answers to those questions that are most similar to the posed question, and ranks those answers based on similarity or overlap to the extracted focus words and domains. The best answer is identified and provided to the user.

Figure 1:
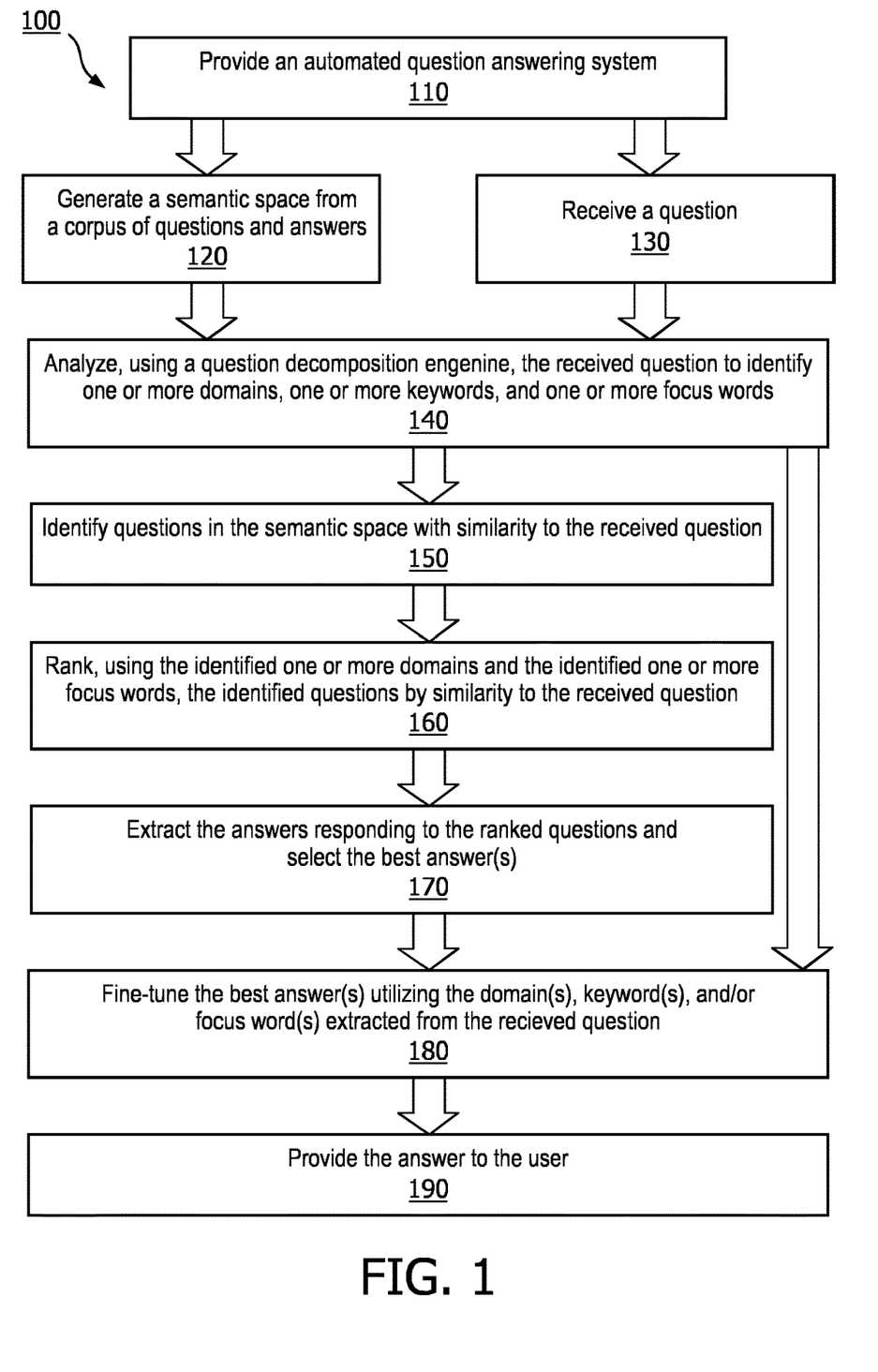
FIG. 1 is a flowchart of a method for automated question answering, in accordance with an embodiment.

Referring to FIG. 1, in one embodiment, is a flowchart of a method 100 for an automated question answering system. At step 110 of the method, an automated question answering system is provided. The automated question answering system may be any of the systems described or otherwise envisioned herein.

At step 120 of the method, a semantic space is created from an existing or generated corpus of questions and/or answers. According to an embodiment, semantic space is a framework for representation of word meaning, typically presented as a mathematical representation. The semantic space is useful for natural language processing, including information retrieval. Words and/or phrases can be represented as high-dimensional vectors, and comparisons between words or phrases can be made by, as just one example, comparing the cosine of the angle between the vectors representing the words or phrases, although many other methods are possible. According to an embodiment, step 120 of the method can be performed once to create a semantic space that is used for numerous question/answer analyses. Alternatively, the semantic space may be recreated or updated on a periodic and/or continuous basis.

Latent semantic analysis (LSA) is one method for semantic space creation. LSA is a form of natural language processing in which words that are similar in meaning will occur in similar text. When the cosine of the angle between two vectors representing two words are compared, results close to 1 represent similar words while results close to 0 represent dissimilar words. Latent Dirichlet allocation (LDA) is another method for semantic space creation. LDA is a form of natural language processing in which a statistical model is formed to allow observations to be explained by unobserved groups that explain why some parts of data are similar. In addition to LSA and LDA, or as an alternative to LSA and/or LDA, other methods and algorithms for creation of the semantic space are possible, including but not limited to Wordnet-based semantic and similarity measure generation.

Any existing or generated corpus of questions and answers utilized to create the semantic space can be obtained from any public and/or private source. According to an embodiment, the semantic space may be built taking, for example, the Yahoo® 4.4 million question answer corpus or any other question/answer collection. Some such embodiments may select all the question titles, clean them by standard stop word removal, and then stem the words. As just one example, various embodiments may build the semantic space with 300 dimensions, although many more or fewer dimensions are possible. Other embodiments may follow the same or a similar cleaning and stemming process.

Figure 2:
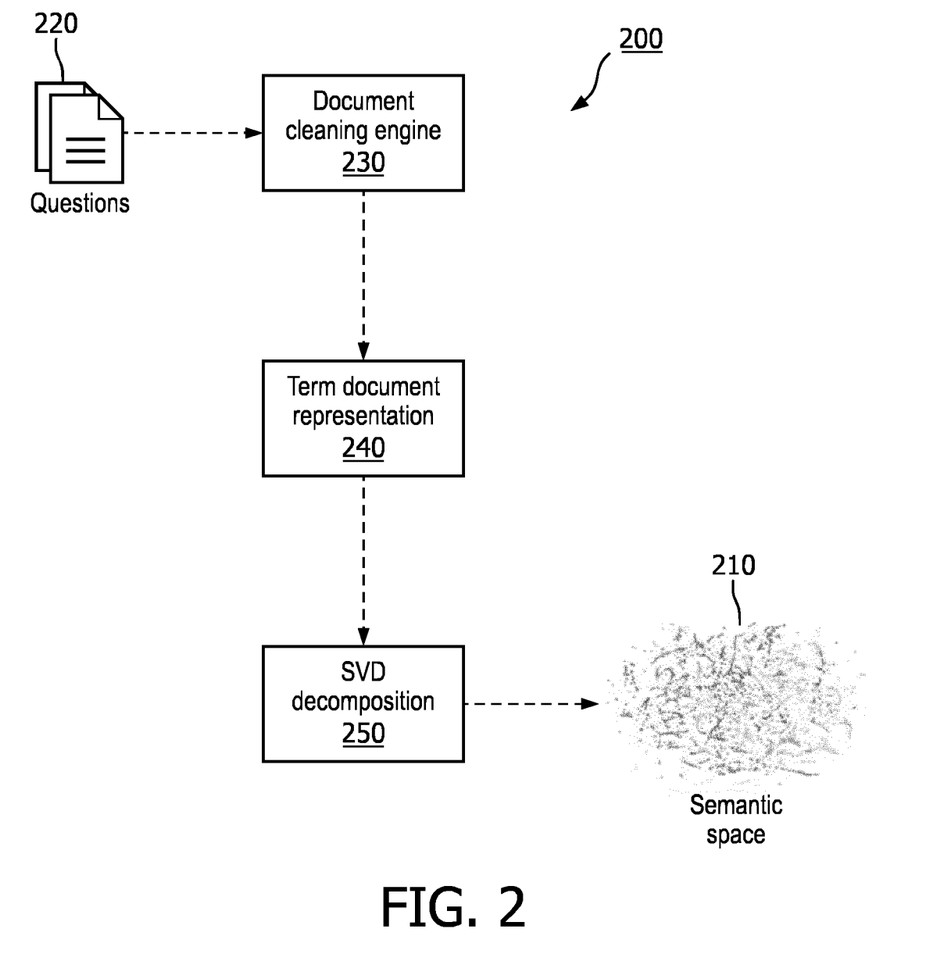
FIG. 2 is a flowchart of a method for semantic space creation, in accordance with an embodiment.

Referring to FIG. 2, in one embodiment, is a flowchart of a method 200 for semantic space 210 creation. According to an embodiment, method 200 is performed by one or more processors of the systems described herein. Alternatively, method 200 may be performed by a remote or unaffiliated processor and the generated semantic space may be utilized by the algorithms or processors of the systems described herein. At 220, the system receives a corpus of questions and/or answers. The system cleans the document or documents comprising the corpus of questions and/or answers at 230, which may be performed by any current or future method for document preparation or cleaning. At 240, the system performs term-document representation analysis, in which terms and documents are represented by a matrix. For example, each of the unique terms in the document collection can be assigned a row in the matrix, while each of the documents in the collection can be assigned a column in the matrix. At step 250 of the method, singular value decomposition (SVD) is performed. SVD is a mathematical approach in which a matrix containing word counts per paragraph—where rows represent unique words and columns represent each paragraph—is constructed from a large piece of text. According to an embodiment, either step 240 or 250 may be performed, or both steps may be performed.

At step 130 of the method, a question is received. The question may be received using any method or system, or any source. For example, the question may be received from a user in real-time, such as from a mobile device, laptop, desktop, wearable device, home computing device, or any other computing device. The question may be received from any user interface that allows information to be received, such as a microphone or text input, among many other types of user interfaces. Alternatively, the question may be received from a computing device or an automated system. For example, a user's smartphone may be programmed to query the system about topics related to the user's actions, movements, location, or other aspects.

The question may be about any topic. For example, questions may include: "Should I sell my house?", "Where is the best place for me to work?", "Where is my car parked?", "Why should I invest in my retirement?" among many, many other types, forms, and variations of questions. The question may be very narrow and fact-specific with a known and constant answer ("Why is the sky blue?"), or may be broad and open-ended with a possibly unknown and inconstant answer ("Can my house be haunted?").

The question may be received directly by the automated question answering system, or may be received remotely and transmitted or otherwise communicated to the system. For example, the automated question answering system may comprise a user interface that receives questions directly. Alternatively, the automated question answering system may comprise a communications module that receives questions from any wired and/or wireless network, such as an intranet or the internet.

Figure 3:
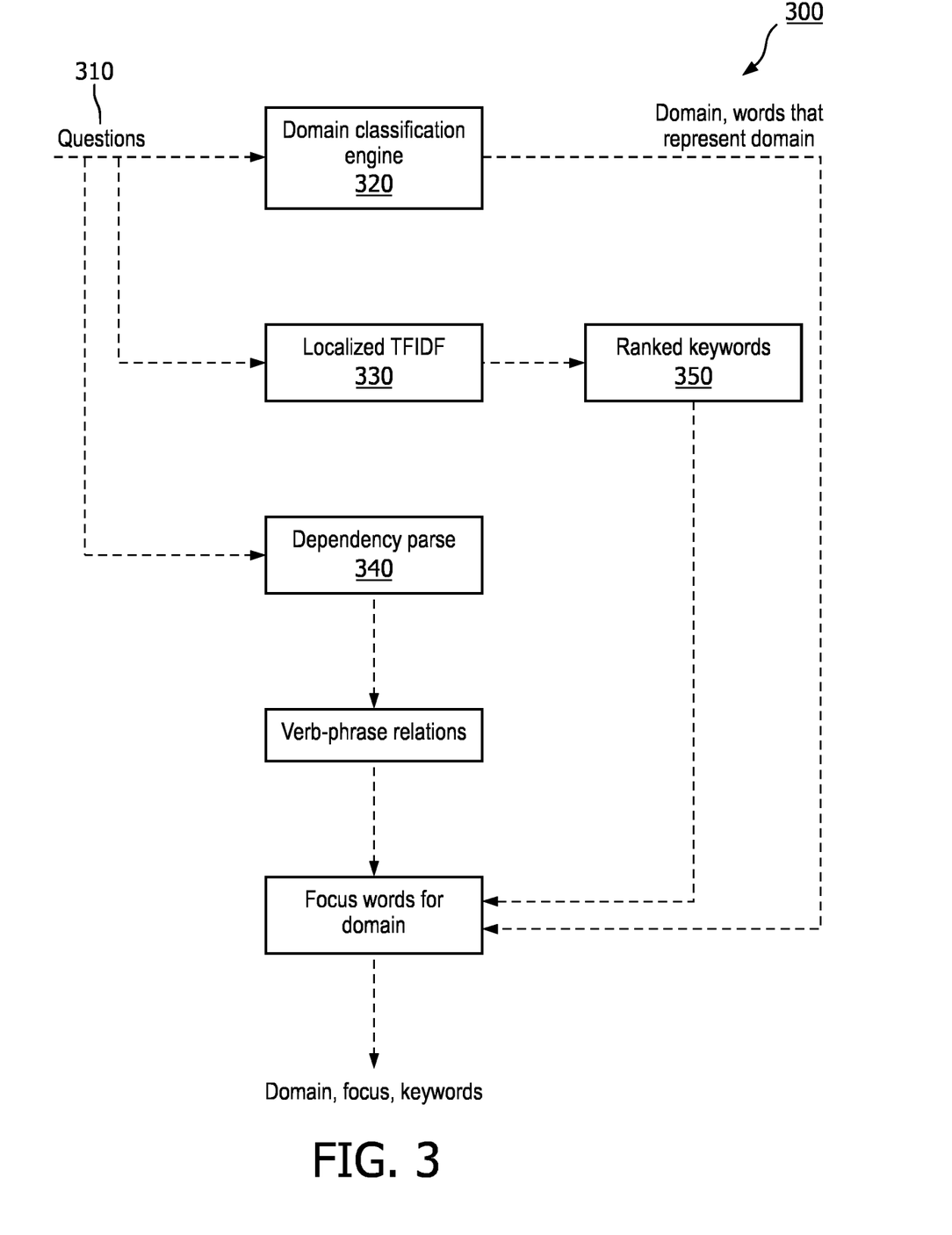
FIG. 3 is a flowchart of a method for question decomposition , in accordance with an embodiment.

At step 140 of the method, a question decomposition engine analyzes the received question to identify one or more elements such as one or more domains, one or more keywords, and one or more focus words from the question. Referring to FIG. 3 is a flowchart of a method 300 for question decomposition. The question 310 is received, and is analyzed by one or more of a domain classification engine 320, a localized term frequency—inverse document frequency engine 330, and/or a dependency parser 340.

According to an embodiment, the domain classification engine 320 analyses the received question 310 using pre-trained question domain identification model built with a deep learning based ensemble technique. Various embodiments use a bidirectional Recurrent Neural Network (RNN)-based encoder-decoder architecture, where the encoder converts the question description to a fixed length vector from which the decoder generates the corresponding domain words.

According to an embodiment, the localized term frequency—inverse document frequency engine 330 analyses the question to determine how important a word is to a document, and may be utilized as a weighting factor. For example, the TFIDF value may down-weight that a word in a question if that word appears frequently in the training corpus. The TFIDF may generate a list of ranked keywords 350 that can be utilized to generate focus words for the question.

According to an embodiment, the dependency parser 340 analyzes the grammatical structure of a sentence, establishing relationships between certain keywords and words which modify those keywords. The output of the dependency parser 340 may be further analyzed to identify verb-phrase relations, among other analyses.

According to an embodiment, the output of the question decomposition engine may be one or more elements including as one or more domains, one or more keywords, and/or one or more focus words of the received question.

Figure 4:
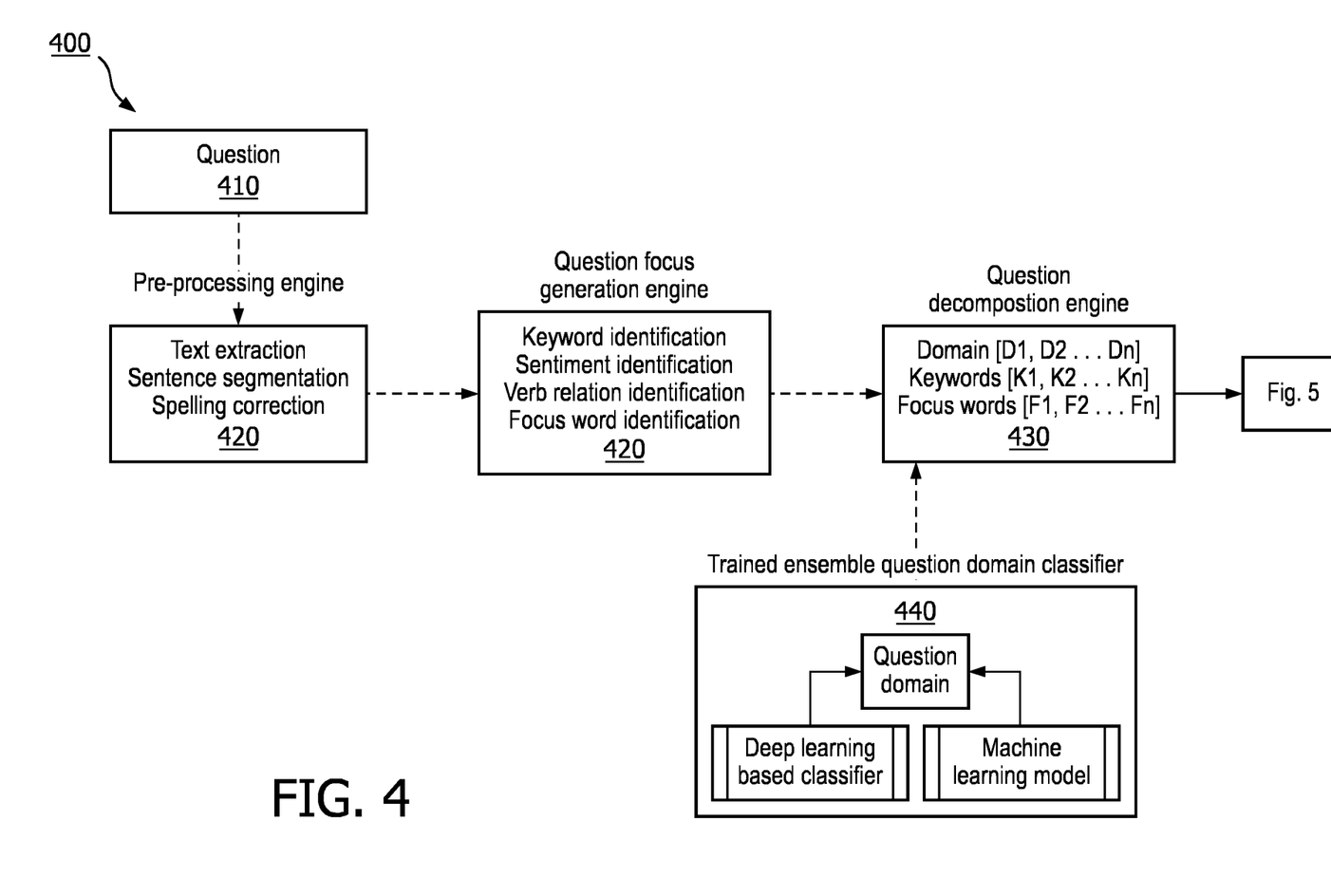
FIG. 4 is a flowchart of a method for question decomposition , in accordance with an embodiment.

Referring to FIG. 4 is another flowchart of a method 400 for question decomposition. The question 410 is received, and is analyzed by a pre-processing engine 420 that identifies and/or extracts text from the received question (such as converting an audio file to text), segments the sentence, and/or corrects spelling in the text. A question focus generation engine 430 analyses the pre-processed question to identify one or more keywords, one or more sentiments, one or more verb relations, and one or more focus words. The question decomposition engine 430, described more completely above with regard to FIG. 3, identifies one or more elements such as one or more domains, one or more keywords, and one or more focus words from the question.

According to an embodiment, for question cleaning, various embodiments may focus on the removal of noisy characters, correction of spellings, and/or sentence segmentation. The language used in the questions maybe informal social media language or slang, for example. Various embodiments use the same steps to clean the body and title of the question. After cleaning the question, embodiments may perform question decomposition by focusing on keyword identification, sentiment identification, and/or focus word generation.

According to an embodiment, the question decomposition engine 430 utilizes a pre-trained ensemble question domain classifier 440. Classifier 440 may comprise a pre-trained question domain identification module build using a deep-learning based ensemble technique. For example, classifier 440 may utilize a bidirectional Recurrent Neural Network (RNN)-based encoder-decoder architecture, where the encoder converts the question description to a fixed length vector from which the decoder generates the corresponding domain words. Other methods of generating a question domain classifier are possible.

At step 150 of the method in FIG. 1, the decomposed question is searched against the generated semantic space to identify questions in the space having strong similarity, such as in semantic structure and/or focus, with the received question. The decomposed question, which may comprise one or more domains, one or more keywords, and/or one or more focus words, may be searched against the semantic space using a variety of methods. Questions in the semantic space with similarity to the received question may be identified using a variety of methods. be located with one or more other components of the system, or may located remote from the system and in communication via a wired and/or wireless communications network.

Figure 10:
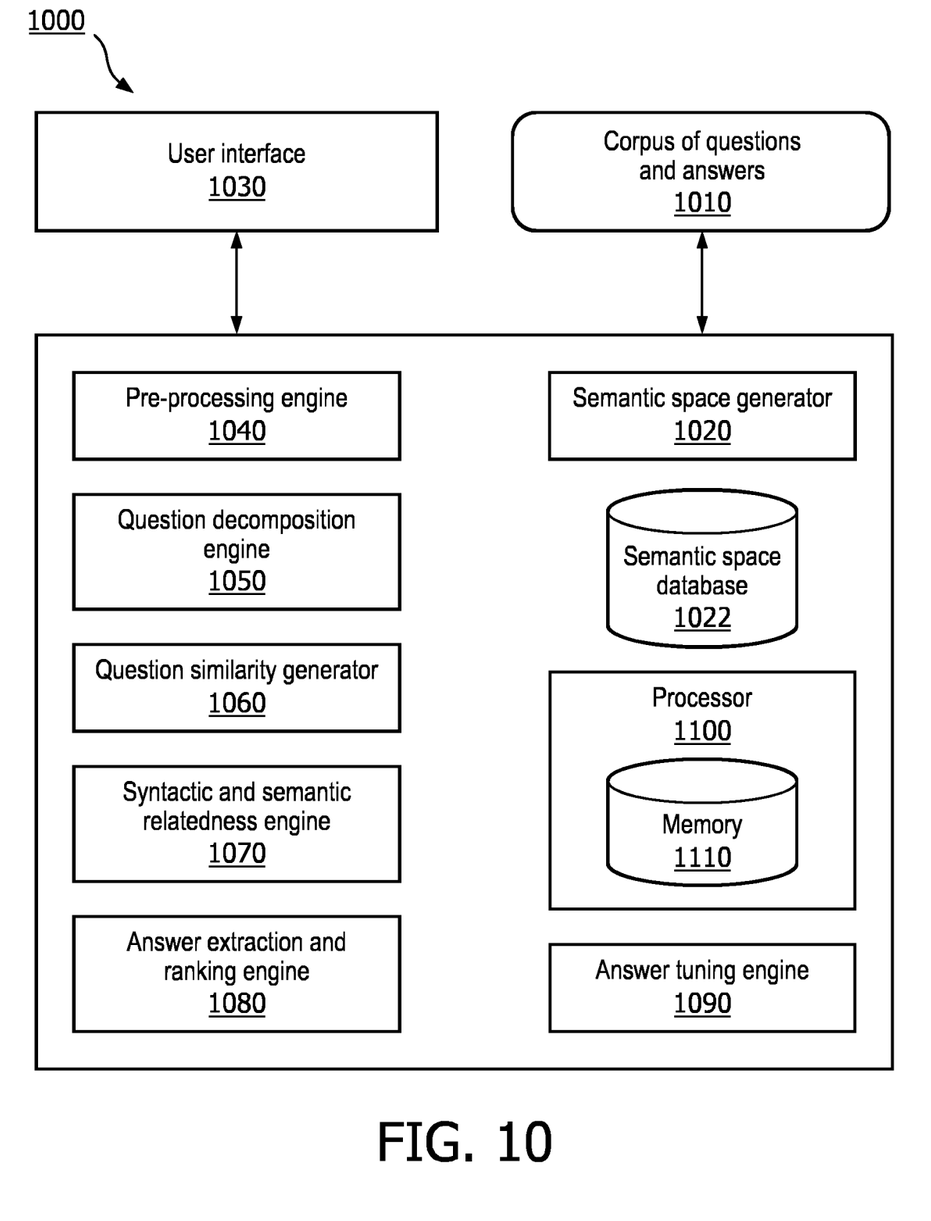
FIG. 10 is a schematic representation of a system for automated question answering, in accordance with an embodiment.

According to an embodiment, system 1000 comprises a pre-processing engine 1040 that identifies and/or extracts text from the received question, segments the sentence, and/or corrects spelling in the text. The pre-processing engine 1040 may comprise a question focus generation engine that analyses the pre-processed question to identify one or more keywords, one or more sentiments, one or more verb relations, and one or more focus words. The pre-processing engine 1040 may provide its output as an input to the question focus generation engine.

According to an embodiment, system 1000 comprises a question decomposition engine 1050 that identifies one or more elements such as one or more domains, one or more keywords, and one or more focus words from the question.

According to an embodiment, system 1000 comprises a question similarity generator 1060 that receives a decomposed question comprising one or more domains, one or more keywords, and/or one or more focus words, and searches it against the generated semantic space to identify questions that are similar to the decomposed question. The similarity may be determined, for example, based on the comparison of the cosines of the vectors of the semantic space questions and the received question, among other methods. The identified questions can then be ranked using the identified one or more domains, one or more keywords, and/or one or more focus words.

According to an embodiment, system 1000 comprises a syntactic and semantic relatedness engine 1070. The syntactic and semantic relatedness engine may identify questions that are semantically most close to the question asked by the user. The engine may also or alternatively determine whether the questions or words in the questions share a hypernymy, hyponymy, or synonymy relationship and may then adjust a weight of the question accordingly.

According to an embodiment, system 1000 comprises an answer extraction and ranking engine 1080. The answer extraction and ranking engine identifies answers within the semantic space associated with the ranked identified questions, where the ranking can be based at least in part on overlap with the identified focus and/or domain. Other methods for ranking of the extracted answers are possible.

According to an embodiment, system 1000 comprises an answer tuning engine 1090, which fine-tunes the identified and ranked answers using the identified one or more domains, one or more keywords, and one or more focus words extracted from the received question. Other methods for fine-tuning the extracted answers are possible. The output of the answer tuning engine 1090 can be provided to the user via user interface 1030.

According to an embodiment, system 1000 comprises a processor which performs one or more steps of the method, and may comprise one or more of the engines or generators. Processor 1100 may be formed of one or multiple modules, and can comprise, for example, a memory 1110. Processor 1100 may take any suitable form, including but not limited to a microcontroller, multiple microcontrollers, circuitry, a single processor, or plural processors. Memory 1110 can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by the processor, controls operation of one or more components of system 1000.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Figure 5:
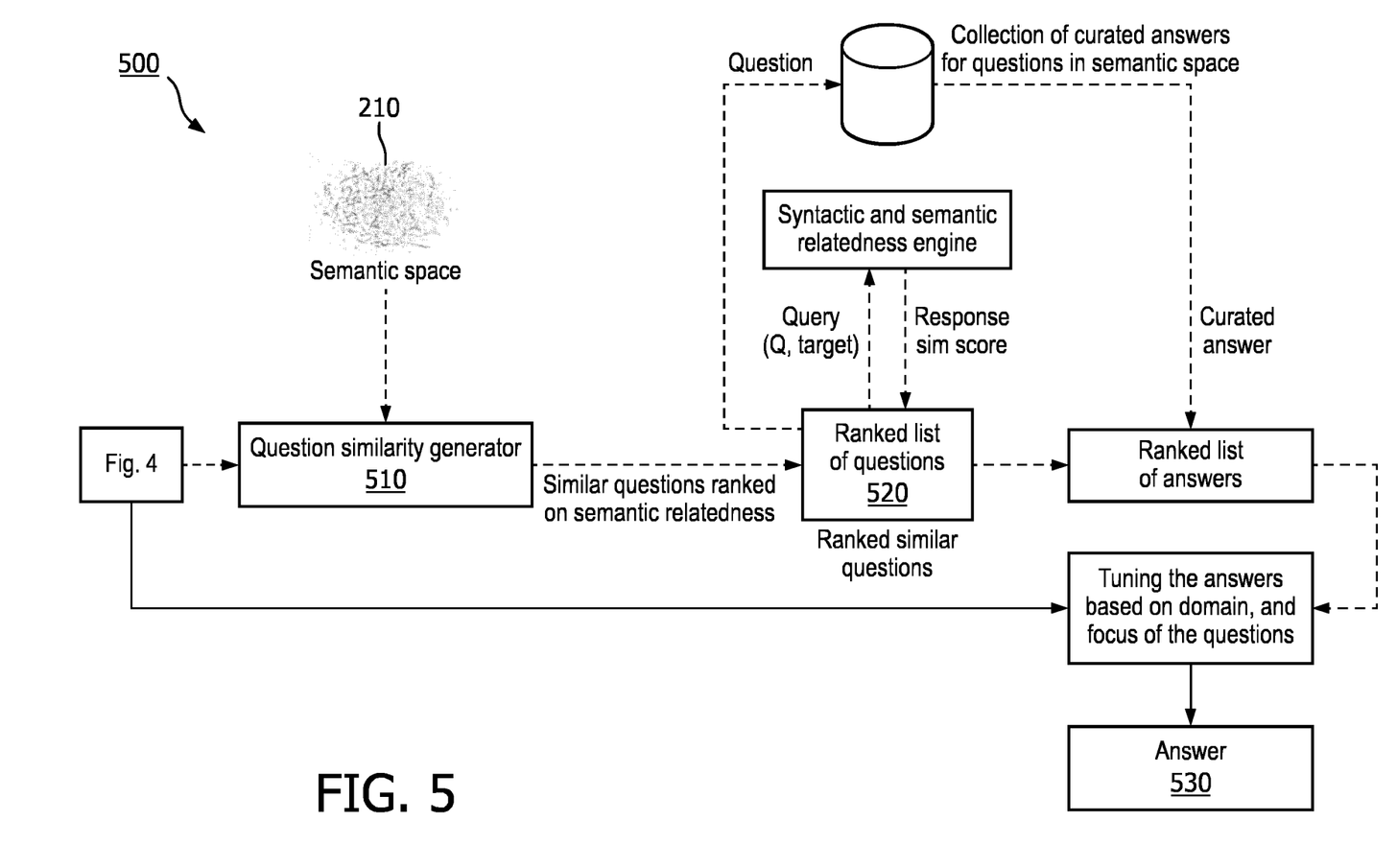
FIG. 5 is a flowchart of a method for identifying questions in a semantic space, in accordance with an embodiment.

Referring to FIG. 5, in one embodiment, is a flowchart of a method 500 for identifying questions in the semantic space with similarity to the received question. The decomposed question comprising one or more domains, one or more keywords, and/or one or more focus words is received from the question decomposition engine 430 and is searched against the semantic space 201 by a question similarity generator 510. For examples, various embodiments of the method described or otherwise envisioned herein may identify questions within the semantic space that have cosine similarity greater than 0:7, although other values are possible. Some embodiments may select the threshold value after experimentation, expert review or analysis, machine learning, or other approaches. The identified questions can then be ranked using the identified one or more domains, one or more keywords, and/or one or more focus words.

Figure 6:
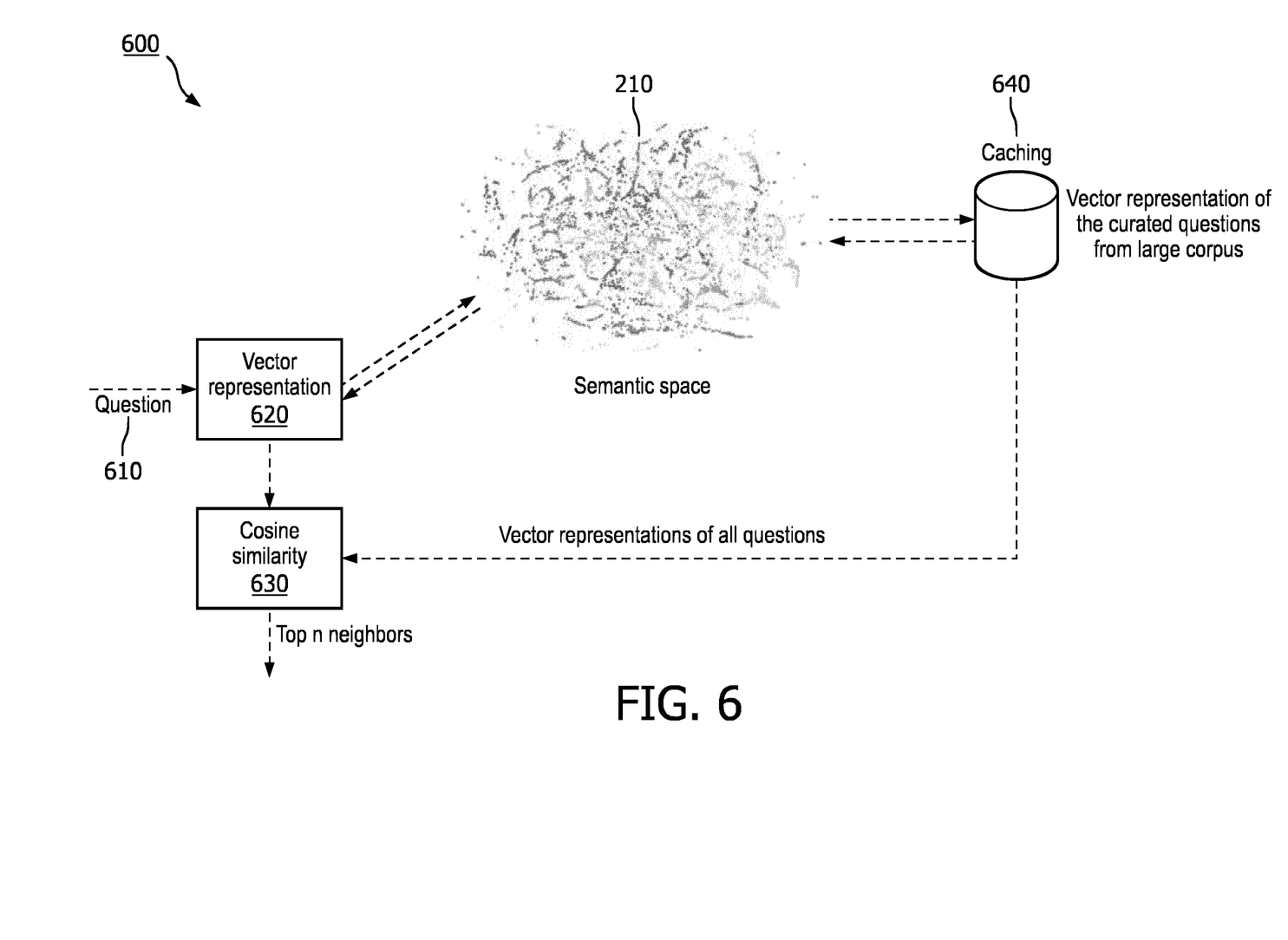
FIG. 6 is a flowchart of a method for identifying questions in a semantic space, in accordance with an embodiment.

Referring to FIG. 6, in one embodiment, is a flowchart of a method 600 for identifying questions in the semantic space with similarity to the received question. The deconstructed or decomposed question 610 comprising one or more domains, one or more keywords, and/or one or more focus words, is received and is converted to a vector representation at 620. Alternatively, the deconstructed or decomposed question is previously converted into, modified, or analyzed to generate a vector representation, and this vector representation is received by the system. The vector representation of the received question is then compared to the generated question vectors in the semantic space 210. According to an embodiment, comparisons to questions within the semantic space with vectors that have cosine similarity greater than a predetermined threshold are identified. The predetermined threshold may be pre-programmed, based on a user setting, derived from machine learning, based at least in part on one or more of the identified one or more domains, one or more keywords, and/or one or more focus words, or set by another mechanism or parameter. According to an embodiment, the question vectors from the semantic space 210 are stored in a database 640 for quick retrieval and analysis.

The output of this filtering is ranked list of semantically similar questions. This list of questions may not exactly relate to the question in terms of polarity and direction of the action as it is a bag-of-words model. In order to extract similar question both in meaning and syntax, the list of questions can be further processed for similar keywords and word order based similarity measures, among other analyses.

At step 160 of the method, the questions identified in step 150 are then ranked using, for example, the identified one or more domains, one or more keywords, and/or one or more focus words to generate a ranked list of questions 520, as shown in FIG. 5.

According to an embodiment, localized keyword extraction based on pre-trained corpus-based TFIDF scores can facilitate the identification of important words in the questions. These words are used to get the word overlap score and re-rank the questions which are obtained from the semantic similarity step. For localized keyword extraction, various embodiments may use one or more keyword extraction algorithms.

After identifying the ranked list of questions that are semantically most close to the question asked by the user, various embodiments can use one or more methods or algorithms to further robustly identify the similarity between the questions. According to one method, an analysis process can be heavily dependent on word-order, and can use Wordnet to identify the strength of the relationship among the words. For example, words belong belonging to the same syn-set, or synonymous words conveying the same sense or meaning, may have a higher weight than the words belonging to different syn-sets.

Additionally, if the words share a hypernymy or hyponymy relationship then the weights can be weighted lower compared to synonymy words. The higher the difference in the level of the relation, the lower the weight. Since this method can be dependent upon the length of the sentences it can be computationally expensive, and thus various embodiments may utilize a caching mechanism to improve the computational speed of the algorithm.

Figure 7:
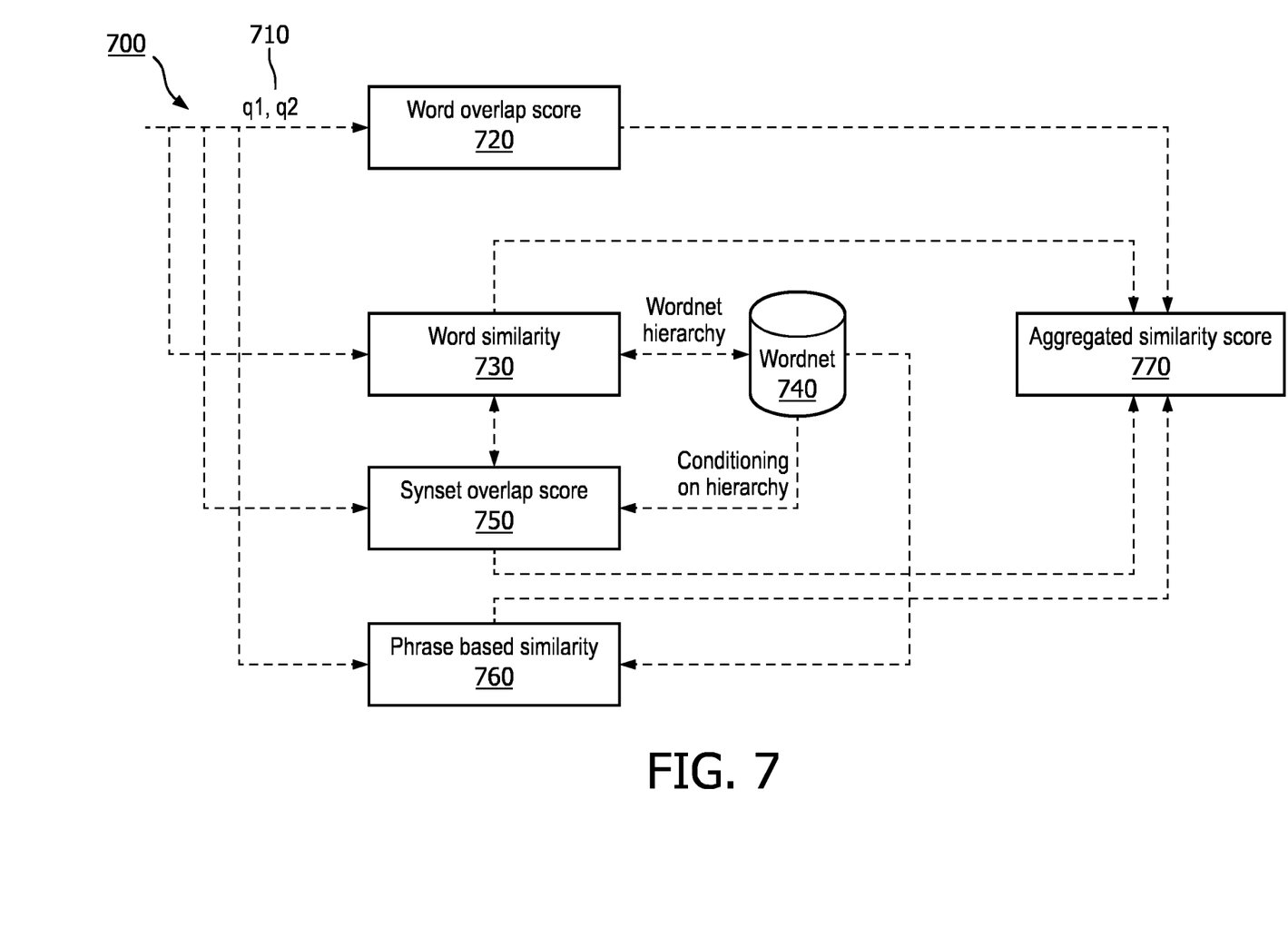
FIG. 7 is a flowchart of a method for ranking identified questions, in accordance with an embodiment.

Referring to FIG. 7, in one embodiment, is a flowchart of a method 700 for ranking the identified questions at step 160 o f the method. The list of questions (q1, q2) 710 is generated and/or received by the system and are analyzed using one or more processes. For example, the list of questions can be analyzed for word overlap score at 720, for word similarity at 730 which may or may not utilize Wordnet 740, for synset overlap at 750, and phrase-based similarity at 760. The output of this process is a list of ranked identified questions with an aggregated similarity score 770.

At step 170 of the method, answers within the semantic space associated with the ranked identified questions are extracted and ranked, where the ranking can be based at least in part on overlap with the identified focus and/or domain. For example, after receiving the final ranked list of questions from the previous step, various embodiments extract the answers previously given to these questions. The system may then rank the answers based on the keyword overlap and match with the focus of the question. If the answers are limited to a specific length, such as 1000 characters or fewer, some embodiments may select one or more sentences that are most representative of the focus and weighted keywords extracted from the question title and question body. Embodiments may pick the best answer that has the question also ranked high and the match of the question features with the answer.

At step 180 of the method, the best answer or answer(s) identified in step 170 are fine-tuned using the identified one or more domains, one or more keywords, and one or more focus words extracted from the received question.

Figure 8:
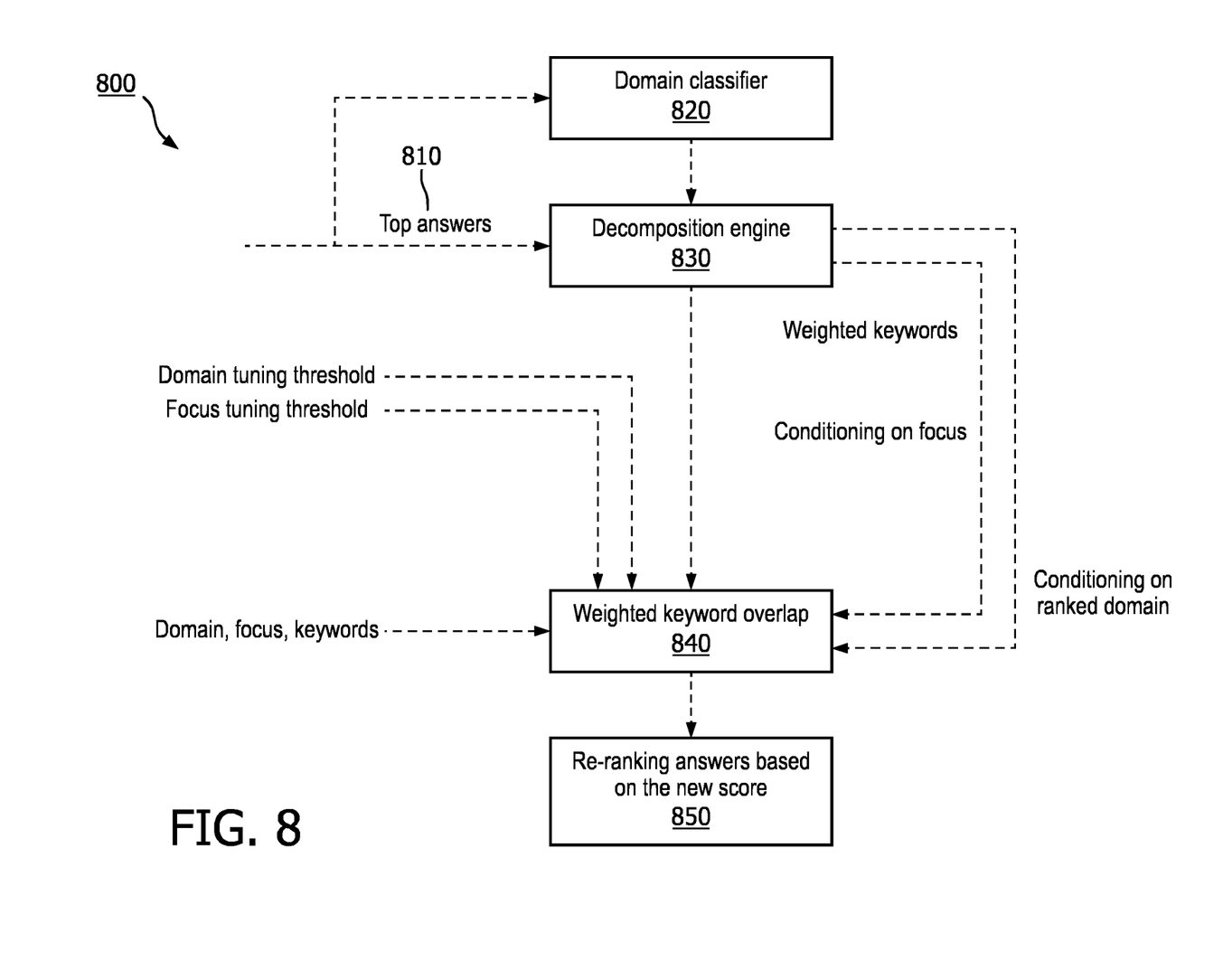
FIG. 8 is a flowchart of a method for ranking and fine-tuning extracted answers, in accordance with an embodiment.

Referring to FIG. 8, in one embodiment, is a flowchart of a method 800 for ranking and fine-tuning extracted answers. The answers 810 to one or more of the ranked identified questions are provided to or otherwise received by the system. These answers are provided to a domain classifier 820 for identification of one or more of the domains of these questions, and are provided to a decomposition engine 830 for decomposition of the answers. The decomposition engine created one or more weighted keywords from the one or more answers, which are then analyzed for overlap at 840. Also at 840, the identified one or more domains, one or more keywords, and one or more focus words extracted from the received question are provided.

At 850, the one or more answers are then re-ranked based at least in part on the fine-tuning, and a single best answer is identified.

At step 190 of the method, a final answer is provided to the user. Referring to FIG. 5, for example, after the answer(s) are fine-tuned, a final answer 530 is provided to the user. The answer can be provided to the user via any user interface that allows information to be conveyed, such as a speaker or screen, among many other types of user interfaces. Alternatively, the answer may be provided from a computing device or an automated system. For example, a user's smartphone may be programmed to automatically query the system about topics related to the user's actions, movements, location, or other aspects, and will automatically receive the answer to provide to the user as needed, on-demand, or otherwise.

According to an embodiment, the final answer is provided to the user in 60 seconds or less, 30 seconds or less, 10 seconds or less, or any a larger or smaller timeframe. This timeframe may be predetermined or may be based on one or more user settings, machine-learned parameters, or any other parameters. For example, the user may specify a timeframe via a user interface or a user setting. This user-specified timeframe may affect one or more steps of the method described herein, such as limiting the amount of processing performed at one or more of the steps.

Figure 9:
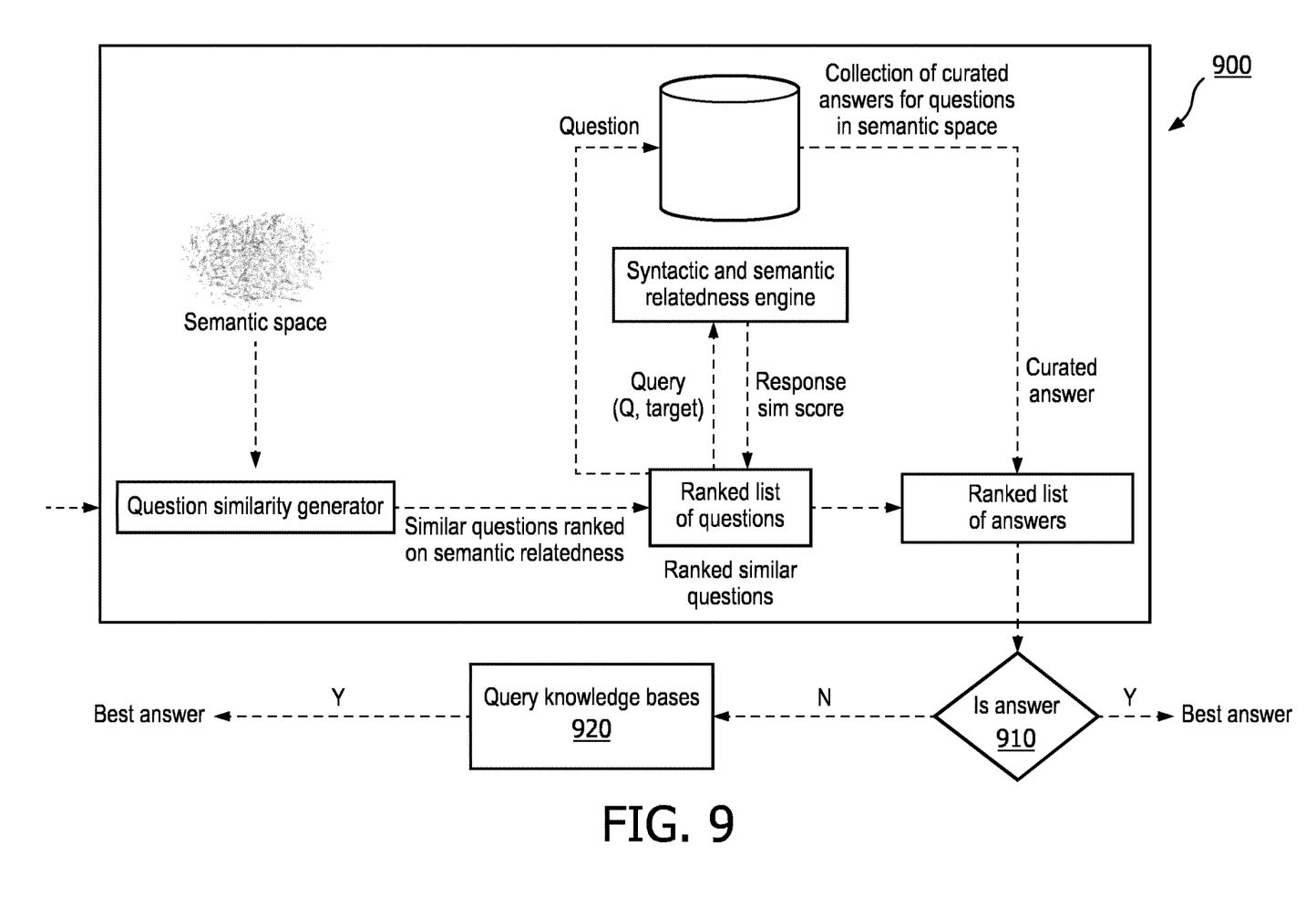
FIG. 9 is a flowchart of a method for automated question answering, in accordance with an embodiment.

Referring to FIG. 9, in one embodiment, is a flowchart of a method 900 for an automated question answering system similar to the methods described above. At 910, the selected best answer is analyzed at a decision point, analyzing the answer to determine whether it is the best answer. This method may apply, for example, in cases where the received question mentions a specific entity and/or has a factual or known answer. For example, the question may be one with a known or entity-based answer ("Who is Mary Poppins?") but for which the semantic space may not have a best answer. Accordingly, the system may compare the answer to a database or other system and determine that it has answered correctly or is likely to have answered correctly, in which case the answer is provided to the user. Alternatively, if the system determines that the answer is not answered correctly or is unlikely to have been answered correctly, the system can query a database of known or entity-based answers at 920 to identify an answer that is the best answer, or is more likely to be the best answer.

Referring to FIG. 10 is a schematic representation of a system 1000 for automated question answering, in accordance with an embodiment. System 1000 can comprise any of the elements, engines, database, processors, and/or other components described or otherwise envisioned herein. According to an embodiment, system 1000 comprises a user interface 1030 to receive a question and/or provide an answer. The user interface can be any device or system that allows information to be conveyed and/or received, such as a speaker or screen, among many other types of user interfaces. The information may also be conveyed to and/or received from a computing device or an automated system. The user interface may be located with one or more other components of the system, or may located remote from the system and in communication via a wired and/or wireless communications network.

According to an embodiment, system 1000 comprises or is in communication with or is in receipt of a corpus of questions and answers 1010. As described or otherwise envisioned herein, the semantic space generator 1020 uses the corpus of questions and answers to generate a semantic space. The generated semantic space can be stored in a semantic space database 1022, which may

What is claimed is:

1. A system for automated question answering, the system comprising:
   a semantic space generated from a corpus of questions and answers;
   a user interface configured to receive a question from a user; and
   a processor comprising:
      a question decomposition engine configured to decompose the received question into two or more of at least one domain, one keyword, or one focus word, the question decomposition engine comprising one or more of a pre-trained question domain identification model that converts the received question into a fixed length vector from which corresponding domain words are generated or a localized term frequency-inverse document frequency engine that generates one or more keywords from which one or more focus words is selected;
      a question similarity generator configured to identify one or more questions in the semantic space using the decomposed question, wherein the identified one or more questions are determined to be similar to the received question;
      an answer extraction and ranking engine configured to:
      (i) extract, from the semantic space, answers associated with the one or more identified questions;
      (ii) identify a plurality of the extracted answers as potential best answers;
      (iii) ranking the potential best answers; and
      an answer tuning engine configured to fine-tune the potential best answers using one or more of the at least one domain, one keyword, and one focus word and produce a fine-tuned answer in response to re-ranking the potential best answers based upon a weighted keyword overlap as a second basis after the ranking of the potential best answers that is based upon overlap with one or more of the at least one domain and one focus word as a different first basis, wherein the fine-tuned answer is provided to the user via the user interface.

2. The system of claim 1. wherein at least some of the questions are associated with a respective answer.

3. The system of claim 1, further comprising:
   a pre-processing engine configured to preprocess the received question, comprising one or more of:
   extracting text from the received question, segmenting a sentence of the received question, and correcting a spelling of the received question.

4. The system of claim 1, further comprising:
   a semantic space database configured to store the semantic space.

5. The system of claim 1, further comprising:
   a syntactic and semantic relatedness engine configured to rank the one or more identified questions based on similarity to the received question.

6. The system of claim 1, wherein the questions in the semantic space comprise a first vector, the decomposed question comprises a second vector, the first vector is compared to the second vector, and the questions in the semantic space are identified as being similar after the vector comparison is above a predetermined threshold.

7. A computerized method for automated question answering, the method comprising:
   providing an automated question answering system comprising a user interface, a processor, and a generated semantic space;
   receiving, via the user interface, a question from a user for which an answer is requested;
   decomposing, by the processor, the received question into two or more of at least one domain, one keyword, or one focus word by applying one or more of a pre-trained question domain identification model that converts the received question into a fixed length vector from which corresponding domain words are generated or a localized term frequency-inverse document frequency engine that generates one or more keywords from which one or more focus words is selected;
   identifying, by the processor, one or more questions in the generated semantic space using the decomposed question, wherein the identified one or more questions are determined to be similar to the received question;
   ranking, by the processor, the one or more identified questions based on similarity to the received question;
   extracting, by the processor from the semantic space, answers associated with the one or more identified questions;
   identifying, by the processor, a plurality of the extracted answers as potential best answers;
   ranking the potential best answers;
   fine-tuning, by the processor, the potential best answers using one or more of the at least one domain, one keyword, and one focus word;
   producing a fine-tuned answer in response to re-ranking the potential best answers based upon a weighted keyword overlap as a second basis after the ranking of the potential best answers that is based upon overlap with one or more of the at least one domain and one focus word as a different first basis; and
   providing, via the user interface, the fine-tuned answer as an answer to the received question.

8. The method of claim 7, further comprising:
   generating the semantic space from a corpus of questions and answers, wherein at least some of the questions are associated with a respective answer.

9. The method of claim 8, further comprising:
   storing the generated semantic space in a database.

10. The method of claim 7, wherein the questions in the semantic space comprise a first vector, the decomposed question comprises a second vector, and further comprising:
    comparing the first vector to the second vector; and
    identifying the questions in the semantic space as being similar after the vector comparison is above a predetermined threshold.

11. The method of claim 10, wherein the predetermined threshold comprises a cosine value.

12. The method of claim 7, further comprising:
    preprocessing, by the processor, the received question, comprising one or more of:
    extracting text from the received question,
    segmenting a sentence of the received question, and
    correcting a spelling of the received question.

13. The method of claim 7, wherein the ranking of the one or more identified questions based on similarity to the received question comprises a semantic and/or syntactic analysis of the identified questions.

14. The method of claim 7, wherein the automated question answering system further includes a pre-trained question domain classifier, and further comprising:
    decomposing the received question based at least in part by the pre-trained question domain classifier.

15. A non-transitory computer-readable medium storing instructions for execution by a processor for automated question answering, the instructions to:

access a generated semantic space;
receive, via the user interface, a question from a user for which an answer is requested;
decompose the received question into two or more of at least one domain, one keyword, or one focus word by applying one or more of a pre-trained question domain identification model that converts the received question into a fixed length vector from which corresponding domain words are generated or a localized term frequency-inverse document frequency engine that generates one or more keywords from which one or more focus words is selected;
identify, by the processor, one or more questions in the generated semantic space using the decomposed question, wherein the identified one or more questions are determined to be similar to the received question;
ranking the one or more identified questions based on similarity to the received question;
extracting from the semantic space, answers associated with the one or more identified questions;
identify a plurality of the extracted answers as potential best answers;
rank the potential best answers;
fine tune the potential best answers using one or more of the at least one domain, one keyword, and one focus word;
produce a fine-tuned answer in response to re-ranking the potential best answers based upon a weighted keyword overlap as a second basis after the ranking of the potential best answers that is based upon overlap with one or more of the at least one domain and one focus word as a different first basis; and
provide, via the user interface, the fine-tuned answer as an answer to the received question.

16. The non-transitory computer-readable medium of claim 15, further comprising:
instructions for generating the semantic space from a corpus of questions and answers, wherein at least some of the questions are associated with a respective answer.

17. The non-transitory computer-readable medium of claim 15, wherein the questions in the semantic space comprise a first vector, the decomposed question comprises a second vector, and further comprising:
instructions for comparing the first vector to the second vector; and
instructions for identifying the questions in the semantic space as being similar after the vector comparison is above a predetermined threshold.

18. The non-transitory computer-readable medium of claim 15, further comprising:
instructions for preprocessing, by the processor, the received question, comprising one or more of:
instructions for extracting text from the received question,
instructions for segmenting a sentence of the received question, and
instructions for correcting a spelling of the received question.

19. The non-transitory computer-readable medium of claim 16, and further comprising:
instructions for decomposing the received question based at least in part by the pre-trained question domain classifier.

* * * * *